United States Patent [19]

Walker

[11] Patent Number: 4,959,237

[45] Date of Patent: Sep. 25, 1990

[54] REVERSE OSMOSIS CONCENTRATION OF JUICE PRODUCTS WITH IMPROVED FLAVOR

[75] Inventor: James B. Walker, Wilmington, Del.

[73] Assignee: E. I. Du Pont de Nemours and Company, Wilmington, Del.

[21] Appl. No.: 362,719

[22] Filed: Jun. 7, 1989

[51] Int. Cl.⁵ ................................................ A23L 2/04
[52] U.S. Cl. ................................ 426/330.5; 426/599; 210/652
[58] Field of Search ..................... 426/592, 330.4, 599, 426/616, 422, 425, 15, 490, 330.5; 210/650, 652, 806, 641, 651, 195.2, 321.79

[56] References Cited

U.S. PATENT DOCUMENTS

| | | | |
|---|---|---|---|
| 3,552,574 | 1/1971 | Lowe | 426/490 |
| 3,617,550 | 11/1971 | Elata et al. | 210/23 |
| 4,322,448 | 3/1982 | Matsuura | 426/490 |
| 4,461,707 | 7/1984 | Thayer | 210/321.79 |
| 4,532,140 | 7/1985 | Bannome | 426/592 |
| 4,617,127 | 10/1986 | Light | 426/592 |
| 4,643,902 | 2/1987 | Lawlon et al. | 426/271 |
| 4,806,366 | 2/1989 | Dick | 210/651 |
| 4,828,705 | 5/1989 | Thakore | 210/651 |

FOREIGN PATENT DOCUMENTS

0070059  6/1982  European Pat. Off. .

OTHER PUBLICATIONS

"The Concentration of Solutions of High Osmotic Pressure by Reverse Osmosis", H. F. van Wijk, R. J. M. Creusen and A. E. Jansen (pp. 115–122), Process Technology Proceedings, 5: Preconcentration and Drying of Food Materials (Thijssen Memorial Symposium—Proceedings of the International Symposium on Preconcentration and Drying of Foods, Eindhoven, The Netherlands, Nov. 5–6, 1987), edited by S. Bruin.

Primary Examiner—Carolyn Paden
Attorney, Agent, or Firm—Craig H. Evans

[57] ABSTRACT

A membrane process for producing an improved product quality comprising feeding a clarified serum at an elevated pressure to a plurality of reverse osmosis units in two stages—the first having high-rejection polyamide membranes and the second having low-rejection membranes, wherein the permeate from the low-rejection membranes is recycled to the high-rejection feed.

15 Claims, 1 Drawing Sheet

REVERSE OSMOSIS CONCENTRATION OF JUICE PRODUCTS WITH IMPROVED FLAVOR

FIELD OF INVENTION

This invention relates to an improved method for concentrating food juices that have superior flavor. Specifically, the method comprises using a plurality of reverse osmosis (RO) units in two stages—one having high—rejection polyamide membranes and one having low—rejection membranes—to concentrate clarified serum.

BACKGROUND OF INVENTION

Juice directly from fresh fruits and vegetables is generally preferred by people, but is readily available only during growing seasons and in specific locations. Thus, juice from the fruits and vegetables must be shipped to other locations than where the fruit and vegetables are grown and the juice must be stored for later use during off-season.

To reduce shipping cost and to achieve longer storage, juices are concentrated and otherwise processed. Since consumers generally prefer the flavor, aroma, appearance and mouth feel of freshly squeezed juices, processors strive to retain such characteristics of freshly squeezed juice in the concentrate and ultimately in the reconstituted juice.

For example, orange juice is frequently concentrated to 60 to 65 weight percent sugar as sucrose (60° to 65° Brix) for shipping from large growing areas such as Brazil primarily to avoid the cost of shipping large quantities of water. Closer to the market, processors will dilute the concentrate to about 42° Brix, the concentration of frozen concentrate available in retail stores. During this processing step, essence and fresh juice are often added to enhance flavor and aroma that are lost when processing the fresh juice initially for shipping and storage.

The processes used to concentrate fruit and vegetable juices often involve steps which detract from the characteristics desired by consumers or have other drawbacks. Juices contain spoilage microorganisms that must be essentially destroyed to achieve adequate storage time (shelf life). These spoilage microorganisms are generally destroyed by pasteurization at temperatures of about 62° C. for 30 minutes or higher temperatures for shorter periods of time. Unfortunately, this process also volatilizes or destroys the aroma and flavor components that are of low molecular weight (30 to 155) and are easily affected at temperatures above 40° C.

Furthermore, fruits and vegetables contain enzymes which can cause off-aroma, off-flavor, loss of color and other undesirable characteristics. Pectinesterase, one undesirable enzyme for example, must be inactivated if one wants to keep the desirable characteristic body and cloud in juices such as orange and grapefruit juice. Temperatures often higher than those needed to pasteurize are needed to inactivate pectinesterase. Consequently, loss of flavor and aroma components is further compounded.

U.S. Pat. No. 4,643,902 (U.S. Pat. No. '902), which is incorporated herein by reference, teaches a process for avoiding many disadvantages of conventional juice processing. It uses ultrafiltration to preferentially pass a UF permeate containing flavor and aroma components while retaining spoilage microorganisms in a UF retentate. The UF retentate is then treated to inactivate, as by heating, a sufficient number of spoilage microorganisms to inhibit spoilage of the juice under storage conditions. The treated UF retentate is then recombined with the UF permeate that contains the flavor and aroma components to provide a food juice suitable for storage but having retained flavor and aroma components.

U.S. Pat. No. '902 avoids much of the volatilization of flavor and aroma components and subsequent need to recover some of the aqueous essence associated with conventional thermal evaporative concentration such as is done by thermally accelerated short time evaporation (TASTE) units for concentrating frozen orange juice. It avoids the entrainment of flavor and aroma components in ice crystals separated from the freeze concentrate during freeze concentration and the oxidative degradation associated with freeze concentration and sublimation concentration.

The process of U.S. Pat. No. '902 first separates pulp and other solids from the juice to a level sufficient for efficient ultrafiltration. It then employs an ultrafiltration stage to preferentially pass a UF permeate containing the lower molecular weight volatile flavor components of fruits and vegetables ranging in molecular weight from about 30 to 155 and other molecules such as sugar and amino acids while retaining larger molecules. The membranes are stated to be tighter than the bacteriological filters which have a pore size of less than 1 nanometer and, thus, retain spoilage compounds such as bacteria, yeasts, molds, fungi and the like as well as undesirable enzymes such as oxidase and pectinesterase, proteins, pectin, and oils.

The UF retentate is passed to an inactivation stage in which undesirable components are inactivated. U.S. Pat. No. '902 does not teach any critical limitations for this stage. It states that the methods employed can vary with spoilage microorganisms being inactivated or destroyed by heat, chemical treatment, desiccation, UV radiation, x-rays and the like. For foods, heating is the preferred method of inactivation.

The UF permeate is fed to a reverse osmosis (RO) unit to concentrate the flavor and aroma components as a RO retentate. The RO retentate, free of most of the spoilage microorganisms which remained in the UF retentate, can be recombined with the inactivated UF retentate to make a storage stable product, for example, a 50° Brix orange juice product capable of storage at about −4° C. for at least 12 months without spoiling.

Nevertheless, it has been found that flavor and aroma losses still occur and the final product quality is not so good as desired This is now hypothesized as being due to two factors. It is felt that some flavor and aroma components are retained in the UF retentate even though the pore size (about 20,000 to 100,000 MWCO) theoretically should allow all such components (molecular weight of about 30 to 155) to pass through. Additionally, it is felt that the product is adversely affected if the processing time for the UF retentate is too long even if the process time is at low temperatures.

By using UF membranes sized to allow the flavor and aroma components to pass through as suggested in U.S. Pat. No. '902, a gel layer forms on the surface of the membrane reducing the effective pore size and resulting in retention of the smaller aroma and flavor components in the UF retentate. Also, the membranes tend to become plugged, particularly at high concentrations of soluble and insoluble components. As the membrane becomes plugged, the processing time for the UF retentate increases and product quality declines. By using a tighter UF membrane, plugging can be minimized but flavor and aroma components may be retained in the UF retentate instead of passing through into the UF permeate as desired.

Furthermore, some of the flavor and aroma components that are fed to the food juice RO concentrators taught in the art pass through into the RO permeate which is discarded.

Patent application Ser. No. 362,546 to Walker et al., filed on the same date as the present application and incorporated herein by reference, teaches an improved process for separating a clarified serum permeate containing flavor and aroma components from a bottoms stream retentate containing spoilage microorganisms. It employs a plurality of microfiltration/ultrafiltration stages, the first of which being equipped with a membrane having a pore size that retains spoilage microorganisms but that is substantially larger than the flavor and aroma components. Pore sizes of subsequent ultrafilters are decreased in size. The aroma and flavor components as well as the sugar, amino acids and the like in the combined UF permeate may be concentrated using an RO system, and the RO retentate may be recombined with the UF retentate after the UF retentate is treated to inactivate spoilage microorganisms.

The RO system of U.S. Pat. No. '902 has further limitations since final concentration depends on the operating pressure needed to overcome the osmotic pressure of the concentrated juice, the viscosity of the concentrate and fouling caused by pectin and other ingredients. Thus, a juice concentrate of about 25° to 30° Brix is typically produced. By employing membranes operable at higher pressures (1500 pounds per square inch gauge), a clarified orange juice, for example, can be concentrated to about 42° Brix.

U.S. Pat. No. 3,617,550 discloses a process for concentrating a feed solution by forcing it through a series of high-rejection membranes, discarding or recycling the permeate and then further concentrating the retentate using a series of low-rejection membranes where the osmotic pressure of the retentate exceeds the working pressure of the low-rejection membranes. Preferably, the permeate from the low-rejection membranes is recycled to the feed to the high-rejection membranes. The process enables production of concentrates having osmotic pressures of several thousand pounds per square inch gauge (psig), which is above the working pressure of the reverse osmosis membranes taught. Orange juice concentrate, for example, with an osmotic pressure of three to four thousand psig would be about 60 to 65° Brix.

SUMMARY OF INVENTION

An improved process has been discovered for concentrating the clarified serum containing flavor and aroma components of a food juice. Preferably the serum is from a permeate from an ultrafilter used to separate clarified serum permeate from bottom solids retentate as taught in U.S. Pat. No. 4,643,902 or, more preferably, from the combined permeates from a plurality of microfiltration/ultrafiltration (MF/UF) stages in series wherein a MF/UF retentate from any stage is fed to the subsequent stage and MF/UF permeates from all stages are combined as taught in co-pending application Ser. No. 07/362,546 to Walker, et al.

The process of this application comprises concentration of the aroma and flavor components as well as the sugar, amino acids and the like by feeding a clarified serum at elevated pressure to a two-stage reverse osmosis (RO) system, the first stage employing high-rejection polyamide membranes and the second stage employing low-rejection membranes, preferably polyamide membranes.

The high-rejection stage may be comprised of a series of RO units in which the RO retentate from the any RO unit feeds the subsequent RO unit with the RO retentate of the last unit in the series feeding the low-rejection stage. The RO permeates from all units are combined for subsequent handling or disposal. The membranes employed in the high-rejection stage are polyamide, preferably aromatic or salicyclic aromatic polyamide membranes.

The low-rejection stage may comprise a series of RO units wherein the membrane in each subsequent RO unit has a lower rejection, that is a higher salt passage, than that in the preceding unit. The materials used in the membranes employed in the low-rejection stage may be that of any reverse osmosis membrane known in the art but preferably are the polyamides used in the high-rejection stage.

The RO retentate from each unit is part of the feed to the subsequent RO unit and the RO permeate from each subsequent RO unit is preferably fed to the preceding RO unit with the permeate from the first RO unit of the low-rejection stage being recycled to the feed of the high-rejection stage.

The RO retentate from the last in the series of low-rejection RO units can be recombined with the UF retentate after the spoilage microorganisms in the UF retentate are inactivated to form a concentrated product. The resulting concentrate may be further concentrated if desired by feeding it to a series of low-rejection RO units with increasingly open membranes and a geometry that can handle the bottom solids from the UF retentate. The RO retentate of one unit is fed to the next and the RO permeate of each subsequent unit is preferably fed to the preceding unit with the RO permeate from the first in the series being returned as part of the feed to one of the initial low-rejection units preferably with a feed concentration similar to the concentration in the RO permeate being recycled.

DETAILED DESCRIPTION OF INVENTION

Figure 1:
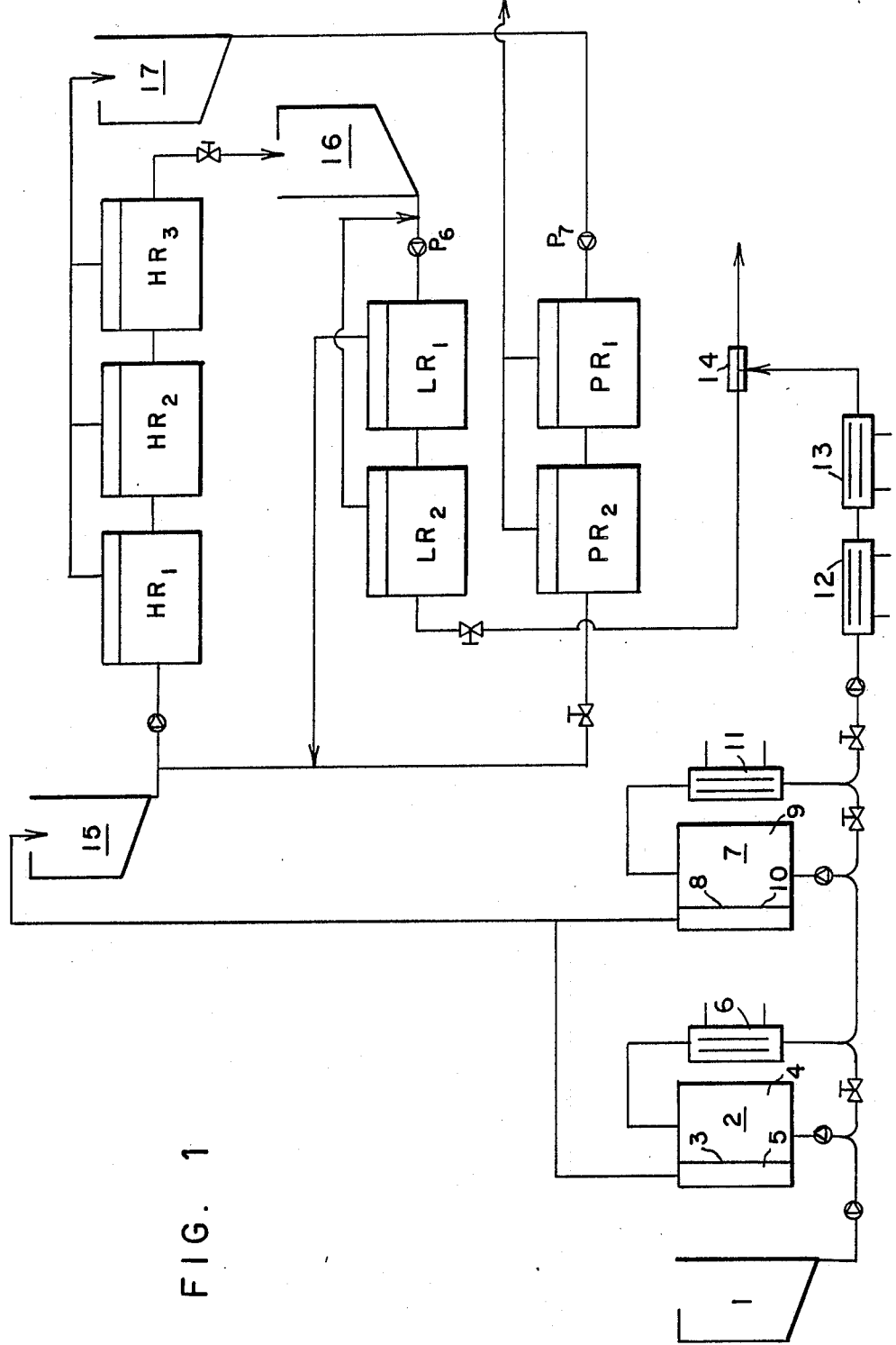
FIG. 1 depicts a preferred embodiment wherein the clarified serum feed from a two-stage microfilter/ultrafilter system is fed to a two-stage RO system followed by a polisher.

The process of this invention is broadly applicable to food juices including both fruit and vegetable juices, particularly citrus juices and more particularly orange and grapefruit juice. The process may be used to make storage stable concentrates with superior flavor, aroma and other desired characteristics from oranges, grapefruit, lemons, tangerines, tangelos, kumquats, apples, pears, peaches, apricots, pineapples, papaya, passion fruit, berries such as grapes, strawberries, raspberries, currants and blueberries, and vegetables such as tomatoes, celery, cabbage, onion, watercress, cucumber, carrot, parsley, beets, asparagus, potatoes, turnips, rutabagas and the like. It may be used to prepare flavor concentrates for use as food ingredients, for example, a cucumber concentrate to be used in a cucumber flavored dip.

While the clarified serum fed to the process of this invention may be from any source that separates clarified serum containing flavor and aroma components of a food juice, the preferred clarified serum is from an ultrafiltration system as taught in U.S. Pat. No. 4,643,902 and more preferably from the microfilter/untrafilter system taught in copending application U.S. Ser. No. 07/362,546.

Referring to FIG. 1, single strength juice (in the case of orange juice with a concentration of about 9° to 13° Brix) and a solids content at a level sufficient for efficient microfiltration and ultrafiltration is fed from feed tank 1 with feed pump $P_1$ to the feed of microfilter 2. The feed pump $P_1$ represents any known means used in ultrafiltration, particularly in food processing, for generating sufficient pressure, preferably 85 to 150 psig (587 to 1035 kPa) to cause a liquid stream to pass through porous membrane 3 positioned and supported so as to separate microfilter 2 into two volumes, a retentate side 4 and a permeate side 5.

Porous membrane 3 contains pores substantially larger than the low molecular weight aroma and flavor components, which are about 30 to 155 molecular weight, as well as other low molecular weight components such as sugar and amino acids but smaller than the larger molecular weight spoilage microorganisms (about 0.3 to 10 micrometers in size) such as bacteria, yeasts, mold, fungi and the like and other components such as enzymes, proteins, pectins and oils. Preferably the pore size is just small enough to prevent the larger undesirable molecules from passing through the membrane. Preferably, the pore size should be 0.1 to 0.2 micrometers.

The liquid stream passing through the porous membrane 3, containing smaller molecule flavor and aroma juice components, is collected as a UF permeate and combined with downstream UF permeate streams for further processing as by reverse osmosis concentration not shown in the figure.

The portion of the feed stream that does not pass through the porous membrane, containing the larger spoilage components, is collected as a UF retentate and fed through optional heat exchanger 6 for cooling as needed to maintain the temperature of the permeate and retentate below about 15° C., preferably about 8° to 10° C. By positioning valves $V_1$ and $V_2$ and employing pump $P_2$ as needed to maintain an adequate pressure on the retentate side of the membrane 3, the UF retentate can be recirculated to microfilter 2 or fed to ultrafilter 7.

Ultrafilter 7 is operated in the same manner as microfilter 2, the primary difference being that the pore size of porous membrane 8 is smaller than the pore size of porous membrane 3. Preferably, the pore size of porous membrane 8 has a molecular weight cut-off (MWCO) of 20,000 to 200,000. The pressure is adjusted as necessary to cause a stream containing small molecules to pass through the membrane 8 into the permeate side 10 while retaining larger molecules on the retentate side 9. The permeate is combined with permeates from other MF/UF units for further processing if concentration is desired. The retentate is either recycled to ultrafilter 7 for temperature control or fed to a pasteurizer or other inactivation means to effectively inactivate spoilage microorganisms and other undesired components collected in the concentrated retentate.

FIG. 1 shows the inactivation means as pasteurizer 12, which can be operated at about 62° C. for about 30 minutes or, preferably, at higher temperatures for shorter periods (85° C. for 15 to 20 seconds) to sufficiently inactivate the undesired microorganisms. The microorganisms will be sufficiently inactivated with about a 98% to 99% kill. Temperatures and time needed for a 100% kill, are more likely to abuse the product causing a "burned" flavor.

The inactivated stream from pasteurizer 12 should be cooled immediately after pasteurization in heat exchanger 13, preferably to less than 15° C., more preferably 8° to 10° C. It then may be mixed in mixing device 14 with the concentrated serum from the RO concentrating system of this invention to make a storage stable product, that is for example, a 50° Brix orange juice product capable of storage at about −4° C. for at least 12 months without noticeable effect on juice quality, particularly upon reconstituting.

The clarified serum, which is depicted as the combined UF permeate from the microfiltration/ultrafiltration system but may be from any known source, is fed to reverse osmosis (RO) feed tank 15 from which it is pumped with a pressure increasing means $P_5$ to a first stage of RO permeators, depicted by $HR_1$, $HR_2$ and $HR_3$, equipped with high-rejection membranes. Additional RO units may be employed if desired.

The membranes used in these high-rejection RO units are membranes having a rejection of greater than 95%, preferably greater than 98% [as measured after one hour at 800 psig (5515 kPa), 30% conversion (recovery), with a 30,000 part per million sodium chloride solution at 25° C.]. The membranes preferably are polyamides, more preferably aromatic polyamides. They may be the asymmetric type as disclosed in U.S. Pat. No. 3,567,632, which is incorporated herein by reference, which are totally aromatic in character. They may contain alicyclic residues such as those derived from cyclohexane-1,3,5-tricarbonyl chloride as employed in U.S. Pat. Nos. 4,520,044 and 4,643,829, which are incorporated herein by reference.

The membranes further are such that they can be operated at the trans-membrane pressures (pressure drop across the membrane) of this invention. Preferably, they are of hollow-fiber construction but other geometries or means allowing trans-membrane pressures of this invention may be used (for example, membrane may be formed on a substrate).

The trans-membrane pressure to $HR_1$ is elevated, that is, above about 1000 psig, preferably 1500 to 2000 psig, more preferably 1500 psig. The feed temperature preferably is less than 15° C., more preferably 8° to 10° C.

The retentate from $HR_1$ feeds $HR_2$, the retentate from $HR_2$ feeds $HR_3$ and the retentate from $HR_3$ feeds the low-rejection stage of RO units ($LR_1$ and $LR_2$). The figure depicts an optional feed tank 16 and pump $P_6$ which can be used to increase the pressure to the low-rejection section if the high-rejection stage is run at lower pressure. Preferably the low-rejection RO units are operated at elevated trans-membrane pressure, that is, above about 1000 psig, preferably 1500 to 2000 psig, more preferably 2000 psig. The feed temperature preferably is less than 15° C., more preferably 8° to 10°C.

The membranes employed in the low-rejection stage may be of any RO membrane material known in the art, but preferably are the same material and geometry as those used in the high-rejection stage. They have a lower rejection, that is higher salt passage as measured by the test described above, than the high-rejection membranes. The preferred limits are discussed below. Preferably, the membranes are hollow fibers but other geometries or means allowing trans-membrane pressures of this invention may be used (for example, membrane may be formed on a substrate).

The permeate from high-rejection RO units HR$_1$, HR$_2$ and HR$_3$ are combined for further processing in a preferred polishing system depicted as polisher feed tank 17, pump P$_7$, and polisher RO units PR$_1$ and PR$_2$. The polishers permit recovery of flavor and aroma components that may pass through the high-rejection membranes. They may be run as depicted, that is, with the retentate of PR$_1$ feeding PR$_2$ and the retentate of PR$_2$ being recycled to the high-rejection RO unit feed with the combined permeates being discharged to waste water. Alternatively, the polishers may be operated in a manner that the permeate of PR$_1$ feeds PR$_2$ and the retentates of both are combined for recycle to the high-rejection RO unit feed.

The polishers are high-rejection RO units essentially the same as HR$_1$, HR$_2$ and HR$_3$, employing membranes selected from the same materials and geometries as can be used in those units. They preferably are operated at an elevate trans-membrane pressure, that is, above about 1000 psig, preferably 1500 to 2000 psig, more preferably 1500 psig. The feed temperature preferably is less than 15° C., more preferably 8° to 10° C.

The low-rejection stage (LR$_1$ and LR$_2$) depict a series of RO units wherein the membrane in each subsequent RO unit should have a lower rejection than that in the preceding unit. More than the two units depicted may be used, the number depending on the concentration desired.

The rejection of the first LR$_1$ in the series preferably is 10% to 15% by the method described above. In a two unit system as depicted, LR$_2$ preferably would have a rejection of 5% to 10%. If additional RO units are added, the rejection would preferably be lower in each succeeding unit.

The RO retentate from LR$_1$ feeds LR$_2$ and, preferably, the RO permeate from LR$_2$ is recycled to a preceding RO unit having a feed that is essentially the same concentration as the permeate being recycled. By essentially the same, it is meant the feed that is closest in concentration to the recycle permeate. Often, as in the two-unit case depicted, this is the immediately preceding RO unit LR$_1$. The permeate from the first RO unit LR$_1$ of the low-rejection stage is recycled to the feed of the high-rejection stage. Alternatively, the permeates from each of the low-rejection units may be combined and recycled to the high-rejection feed or may be fed to other units upstream.

The RO retentate from the last in the series of low-rejection RO units LR$_2$ can be recombined in mixer 14 with the UF retentate after the spoilage microorganisms in the UF retentate are inactivated to form a concentrated storage-stable product. The resulting concentrate may be further concentrated if desired by feeding it to a second series of low-rejection RO units with increasingly open membranes and a geometry that can handle the bottom solids from the UF retentate, the RO retentate of one unit feeding the next and the RO permeate of each subsequent unit preferentially feeding the preceding unit with the RO permeate from the first in the series being returned as part of the feed to one of the initial low-rejection units preferably with a feed concentration similar to the concentration in the RO permeate being recycled. Alternatively, the permeates may be combined and fed to the low-rejection or high-rejection stage at any feed point.

EXAMPLES

Example 1

A clarified orange juice serum [MF/UF permeate from a system operated with a 11.5° Brix feed at 87 psig and 10° C. in accord with U.S. Ser. No. 07,362,546 using a 0.2 micrometer membrane in the microfilter and a 20,000 MWCO membrane in the ultrafilter] was fed to a RO system having the configuration of FIG. 1 at 1500 psig and a temperature of 10° C., the high-rejection stage having three RO units equipped with aromatic polyamide membranes having a 98.5% salt rejection, the retentate of the first feeding the second, that of the second feeding the third and that of the third feeding the low-rejection stage. The permeates from the three RO units were combined and fed at a trans-membrane pressure of 1500 psig to a single polisher equipped with the same type membrane as the high-rejection units. The retentate from the polisher was recycled to the feed to the first high-rejection RO unit and the permeate, primarily water, was discarded.

The RO retentate leaving the final high-rejection RO unit was fed at a trans-membrane pressure of 1500 psig to a single low-rejection RO unit equipped with membranes having a 93% salt passage. The permeate having a sugar concentration of 20° Brix was recycled to the feed to the first high-rejection unit.

The retentate from the low-rejection stage having a sugar concentration of 52.4° Brix was mixed with the untreated retentate from the ultrafilter to make a fully blended 45° Brix product which was found in a taste test to be of equal quality to the fresh juice fed to the system.

Example 2

A clarified orange juice serum [MF/UF permeate from a system operating with a 9° Brix feed at 87 psig and 10° C. in accord with U.S. Ser. No. 07/362,546 using a 0.2 micrometer membrane in the microfilter and a 20,000 MWCO membrane in the ultrafilter] is fed to a RO system having the configuration of FIG. 1 at 1500 psig and a temperature of 10° C., the three unit high-rejection stage being equipped with aromatic polyamide membranes having a 98.5% salt rejection, the retentate of the first feeding the second, that of the second feeding the third and that of the third feeding the low-rejection stage. The permeates from the three RO units are combined to be fed at a trans-membrane pressure to a single polisher equipped with the same type membrane as the high-rejection units. The retentate from the polisher is recycled to the feed to the first high-rejection RO unit and the permeate, primarily water, is discarded.

The RO retentate leaving the final high-rejection RO unit is fed at a trans-membrane pressure of 2000 psig to two low-rejection RO units in series, the first being equipped with a membrane having a 93% salt passage and the second being equipped with a membrane having a 97% salt passage. The retentate of the first having a sugar concentration of 50° Brix is the feed to the second. The permeate from the first having a sugar concentration of 18° Brix and that of the second having a sugar concentration of 40 Brix are combined to form a 31° Brix combined permeate which is recycled to the feed to the first high-rejection unit.

The retentate from the second low-rejection unit having a sugar concentration of 63° Brix is mixed with the retentate from the ultrafilter to make a fully blended 54° Brix product having superior taste, that is comparable to the fresh juice feed.

We claim:

1. A membrane process for preparing a concentrated superior-tasting food juice comprising the steps of:
    (a) feeding a clarified serum to a multistage reverse osmosis (RO) system, wherein the serum is fed at a trans-membrane pressure of 1000 psig or greater to the first stage of the system which comprises one or more RO units having high-rejection polyamide membranes in which the retentate of one unit is fed to the subsequent unit if there are more than one; and
    (b) feeding the retentate from the last of the high-rejection RO units at a trans-membrane pressure of 1000 psig or greater to the second stage which comprises one or more RO units having low-rejection membranes, wherein the retentate of each low-rejection RO unit is fed to the subsequent unit if there are more than one and wherein all permeates from the second stage are ultimately recycled to the first stage.

2. The process of claim 1 wherein the permeates from each unit in the second stage are fed to the feed side of the preceding RO unit.

3. The process of claim 1 wherein the trans-membrane pressure in the first stage is 1500 psig and the trans-membrane pressure in the second stage is 2000 psig.

4. The process of claim 1 wherein the membrane in stage one is a hollow fiber aromatic polyamide membrane.

5. The process of claim 1 further comprising feeding the permeate from the first stage a polisher stage which comprises one or more RO units having high-rejection polyamide membranes wherein the retentate from the polisher stage is recycled to the first stage.

6. The process of claim 1 wherein there is more than one low-rejection RO unit and the permeate from each is fed to a preceding RO unit having a feed concentration that is essentially the same as that of the recycled permeate.

7. A membrane process for preparing a concentrated storage-stable superior-tasting food juice comprising the following steps:
    (a) providing from a juice-bearing fruit or vegetable a juice suitable for ultrafiltration;
    (b) permeating said juice first through an ultrafiltration stage which stage is equipped with a porous membrane having a pore size larger than the size of desirable flavor and aroma components but smaller than undesirable microorganisms to form a permeate stream containing flavor and aroma components and a retentate stream containing undesirable microorganisms;
    (c) treating retentate from (b) above to inactivate a sufficient number of undesirable microorganisms to inhibit spoilage of juice under storage conditions; and
    (d) feeding permeate from (b) to a multi-stage reverse osmosis (RO) system, wherein the serum is fed at a trans-membrane pressure of 1000 psig or greater to the first stage of the system which comprises RO units having high-rejection polyamide membranes in which the retentate of one unit is fed to the subsequent unit and the retentate from the last of the high-rejection RO units is fed at a trans-membrane pressure of 1000 psig or greater to the second stage which comprises RO units having low-rejection membranes, wherein the retentate of each low-rejection RO unit is fed to the subsequent unit and wherein all permeates from the second stage are ultimately recycled to the first stage; to produce a concentrated RO retentate which is combined with the treated retentate of step (c) to produce a storage-stable superior-tasting concentrated product.

8. The process of claim 7 wherein the membrane in stage one of the RO system is a hollow fiber aromatic polyamide membrane.

9. The process of claim 7 further comprising feeding the permeate from the first stage of the RO system to a polisher stage which comprises one or more RO units having high-rejection polyamide membranes wherein the retentate from the polisher stage is recycled to the first stage.

10. The process of claim 7 wherein there is more than one low-rejection RO unit in the RO system and the permeate from each is fed to a preceding RO unit having a feed concentration that is essentially the same as that of the recycled permeate.

11. The process of claim 7 wherein the permeate from these units are ultimately recycled to the high-rejection RO units of step (d).

12. A membrane process for preparing a concentrated storage-stable superior-tasting food juice comprising the following steps:
    (a) providing from a juice-bearing fruit or vegetable a juice suitable for ultrafiltration;
    (b) permeating said juice first through a microfiltration stage which stage is equipped with a porous membrane having a pore size substantially larger than the size of desirable flavor and aroma components but smaller than undesirable microorganisms to form a permeate stream containing flavor and aroma components and a retentate stream containing undesirable microorganisms;
    (c) feeding said retentate stream to an ultrafiltration stage which stage is equipped with a porous membrane having a smaller pore size than the microfilter in (b) above to separate a permeate and retentate stream;
    (d) treating retentate from (c) above to inactivate a sufficient number of undesirable microorganisms to inhibit spoilage of juice under storage conditions; and
    (e) feeding recombined permeate from (b) and (c) to a two-stage reverse osmosis (RO) system, wherein the first stage comprises RO units having high-rejection membranes in which the retentate of one unit is fed to the subsequent unit with the retentate from the last of the high-rejection RO units being fed to the second stage which comprises RO units having low-rejection membranes, the pore size of which being more open in each subsequent unit, wherein the retentate of each low-rejection RO unit is fed to the subsequent unit and the permeate from each subsequent unit is fed to the feed side of the preceding RO unit; to produce a concentrated RO retentate which is combined with the treated retentate of step (d).

13. The process of claim 12 wherein the membrane in stage one of the RO system is a hollow fiber aromatic polyamide membrane.

14. The process of claim 12 further comprising feeding the permeate from the first stage of the RO system to a polisher stage which comprises one or more RO units having high-rejection polyamide membranes wherein the retentate from the polisher stage is recycled to the first stage.

15. The process of claim 12 wherein there is more than one low-rejection RO unit in the RO system and the permeate from each is recycled to a preceding RO unit having a feed concentration that is essentially the same as that of the recycled permeate.

* * * * *